UNITED STATES PATENT OFFICE.

CHARLES C. MOORE, JR., OF LEXINGTON, KENTUCKY, ASSIGNOR TO THE TROPICAL PRODUCTS COMPANY, OF WASHINGTON, DISTRICT OF COLUMBIA, A CORPORATION OF WEST VIRGINIA.

PROCESS OF TREATING CASSAVA AND PRODUCING ALCOHOL THEREFROM.

977,465. Specification of Letters Patent. Patented Dec. 6, 1910.

No Drawing. Application filed December 21, 1906. Serial No. 348,996.

To all whom it may concern:

Be it known that I, CHARLES C. MOORE, Jr., a citizen of the United States, residing in Lexington, in the county of Fayette and State of Kentucky, have invented certain new and useful Improvements in Processes of Treating Cassava and Producing Alcohol Therefrom; and I do hereby declare the following to be a full, clear, and exact description of the same, such as will enable others skilled in the art to make and use the same.

This invention relates to processes of treating cassava and producing alcohol therefrom, and consists in a method of producing alcohol and other valuable products from cassava tubers and like materials containing starch together with soluble fermentable matter by an organized succession of steps, each separately useful and together coöperating to produce alcohol and by-products in a cheap, ready and simple manner; all as more fully hereinafter set forth and as claimed.

Cassava or manioc produces a very large yield per acre of tubers rich in total carbohydrates, and grows thriftily in parts of the country and upon soils where no other field crop does well, but hitherto because of inherent difficulties it has not been much utilized in the arts. In the fresh state, immediately after digging, the tubers contain from 4 to 8 per cent. of sugars or soluble fermentable matter and 20 to 35 per cent. of starch, but these percentages rapidly decrease thereafter as the tubers at once begin to spoil. They cannot be stored and it is ordinarily impracticable to keep them over a day or so after digging without great deterioration. This is ordinarily ascribed to the action of bacteria and yeast, and no doubt this plays some part, particularly where the tubers are peeled, bruised or broken, for the high content of sugar in the juices makes them very susceptible of fermentation. But, as I have discovered, enzymic activity of the juices and tissues of the fresh tubers is much more responsible for the rapid deterioration. Cassava is rich in enzymic bodies which begin their work at once upon digging of the tubers and produce extensive and far-reaching changes in the tissues and constituents thereof. In a little time after digging, a section of a tuber will show clearly apparent rings where tissue and constituents have been changed and altered. Certain of these enzymic bodies produce hydrocyanic acid and cyanids, causing the well-known poisonous nature of some varieties of fresh cassava. Certain other enzyms, appearing to be always present in fresh cassava, rapidly break down the starch into soluble bodies, apparently at first into dextrin and other ill-defined unfermentable bodies. The cellular tissue apparently shares in this degradation. Proteolytic enzyms are also present. The contained sugars also tend to disappear in some manner, probably because of enzymic action, even prior to access of micro-organisms. Still another, and very important, action of enzymic nature, always noticed in cut or broken tubers is a blackening or discoloration; probably due to the presence of a "laccase" or "oxidase." This discoloration is a serious hindrance to the manufacture of high grade starch.

Expensive experience has shown the experimenters in this field that utilization of cassava tubers more than a day or so old is substantially impracticable and that even with the fresh tubers it is substantially impracticable, apart from the question of supply to a factory of any large capacity, to make starch on any but the smallest scale because of difficulties caused by souring and spoiling in the starch apparatus. The stated enzymic actions rapidly convert the material into forms very suitable for bacterial growth. These difficulties have also prevented any attempts at the direct utilization of the large sugar content of the tubers for making alcohol. I have however discovered that if the enzymic activity of the cassava be arrested, these difficulties disappear and it is perfectly possible to utilize both the starch and the sugars or fermentable soluble bodies of the tubers. Cassava starch, because of its inherent advantageous properties, is much desired in the trade and it is best recovered as such in lieu of being hydrolyzed and fermented, as has been proposed, and with such recovery in the manner hereinafter described, the natural sugars and other fermentable soluble bodies of the tuber are left available for alcohol making. Their quantity and character make them eminently suitable for this purpose. Low-grade dirty starch, scums, fibers and precipitates produced in the process may be hydrolyzed and added to the sugars for fermentation, but at ruling prices, it is best to recover as much of the cassava starch as is practicable from such by-products.

I have discovered that in order to arrest, neutralize or destroy enzymic activity and make cassava suitable for utilization, it is necessary to comminute the tubers as soon as practicable after digging and treat the pulp, shreds or slices in such manner as to prevent contained enzyms from functioning. A very simple way, ordinarily best conducted on the farm where the tubers are produced, is to rasp or thinly slice them to convert them into a finely divided form and dry at once and as rapidly as possible, consistent with a temperature low enough to be below the hydrolyzing point of starch. It is frequently possible in the sunny portions of the country where cassava grows to the best advantage, to effect sufficiently rapid drying by exposing very thin or frequently stirred layers of fresh rasped or grated cassava in trays to the direct action of sun or wind. Or the rasped or sliced cassava may be quickly dried in any of the commercial forms of low-temperature driers. Drying at a speed sufficient to outstrip the enzymic activity of the cassava is absolutely necessary and the comminuted tubers must not be allowed to stand untreated. When the available facilities for rapid drying are inadequate, I have found that by adding soluble salts, such as common salt or alkali sulfites, or dilute acids the activity of the enzyms is reduced and the necessity for speed is not so great. For some purposes, the addition of a little sodium carbonate or bicarbonate, or the corresponding potassium salts, or even dusted slaked lime is useful as these alkaline bodies possess a specific enzym-arresting function in the case of starch-hydrolyzing enzyms.

Of course where the comminuted cassava can be treated with enzym-arresting chemicals, drying can be performed at leisure or omitted altogether, the wet, treated pulp being stored or worked up at once. Quick comminution after digging and treatment in some manner to arrest the activity of the enzyms are, however, always necessary. And even when the fresh wet treated pulp is used in the factory operation, in the method hereinafter described, it is usually advantageous to employ with it a certain amount of the dried pulp, produced as described. This is for the reason that for fermentation it is ordinarily desirable to have liquids of greater concentration, as regards sugars, than is the sap of the tuber, say 4 to 14 per cent., and without some desiccation of the tubers this is obviously impossible, even with the methodical use of settled starch liquor hereinafter set forth.

When dried in the manner described, with or without chemicals the comminuted cassava does not blacken and it preserves its full content of starch and sugars. Dried alone it is very suitable for feeding and like purposes, being perfectly permanent if kept dry. But when so dried alone if subsequently used, in the starch and alcohol manufacture it must ordinarily be used only with liquids arresting enzymic activity unless the starch separation be very rapid indeed. Simple drying at low temperatures does not destroy enzyms but merely arrests their activity, and when the dried cassava is moistened the activity of the enzyms recommences.

In the actual operation I usually rasp, slice or grate the cassava and then pass it between edge-stones together with sufficient liquid to form a starch milk. Where fresh tubers are being employed, they are best preliminarily scoured in a scouring drum of usual construction to remove sand and dirt. In the liquid employed in forming the starch milk, unless chemicals have been employed in drying the cassava or preserving the pulp, I employ suitable chemical means to arrest enzymic activity and also fermentation. A small amount of sulfuric or hydrochloric acid will serve. Lactic acid is also suitable. By allowing a portion of cassava to sour to the maximum extent, employing the clear liquid in making starch milk, separating the starch and fermenting the residual liquid to alcohol, the lactic acid will go forward into the still and be concentrated therein. The residual slop will contain it and a portion may be used in lieu of water or the described specially formed solution containing lactic acid in the starch-milk making operation.

The more rapid the starch separation can be made, the less is the proportion of acid or other chemical necessary in the starch milk. Rapid work can be secured by the use of starch centrifugals, either of the continuous or non-continuous types. The starch from the pure starch zones in these machines after washing may be treated in the usual manner to make merchantable starch. The washings may be returned to the grinders for use in lieu of water, but in such event it is ordinarily desirable to use some dried cassava to make up for the dilution. The liquid separated from the starch by the machine is also to be returned in part to the grinders, the remainder being sent forward for fermentation, after partial neutralization if deemed necessary. Reuse of the separated starch-liquor in starch making is eminently desirable, the addition of too much water, as stated, leading to too great a dilution of the sugar solution. Ordinary starch tables may also be used for separating the starch. The liquor from which the starch has been separated is used in the manner just described.

Dirty starch, either from the tables or the drums, may be reconverted into starch milk and reseparated, the pure starch obtained being marketed and the less pure, together with coagula, scums and the like, being hydrolyzed with acid or diastase and added to the sugar solution in the fermenting vats. Or the whole amount of dirty starch may be so hydrolyzed. This is of course a matter that will depend on ruling prices for starch and alcohol.

Passing the starch tables, the liquid is murky with suspended coagulum, consisting of fiber, enzyms and other proteids coagulated by the acid or other chemical and mechanical impurities. This matter should be whirled or otherwise separated from the liquid to clarify the same prior to return to the grinding mill or to delivery to the fermenters or evaporators. The solid matters so separated are valuable as feed, being rich in nitrogen. If deemed desirable, the starch and fibers contained may be hydrolyzed with acid and utilized in the fermenters. Using a centrifugal apparatus, this feed stuff will be found next the dirty starch layers and may be easily separated mechanically. From centrifugals the separated liquor is as a rule sufficiently clarified for use.

Employing fresh cassava, which contains around 60 per cent. of water, since the starch and fiber leave the system with only about 12 per cent. of moisture by returning the extracted liquors after separating the starch, there is an evident overplus of such liquid, without taking into consideration the water used in washing starch, etc., and added. It is this overplus which is sent to the fermenters.

In normal operation, the cassava is ground with separated starch liquor, some portion of the clarified distillery slop and the washings of the starch; the starch separated from the starch milk, such portion of the starch liquor as may be needed returned to the mills, and the rest of the starch liquor sent to the fermenters.

Fermentation is conducted as usual and distillation of alcohol performed in any of the ordinary stills. The residual liquid or slop after distillation contains a considerable amount of coagulum and separated matter, useful as cattle feed. Where lactic acid has been used in arresting enzymic action in the manner described, it remains in concentrated form in the clear liquid separated from this solid matter and, as stated, is capable of reuse. If the fermentation is carried on in the usual manner, some lactic acid is formed and this serves to replenish the supply and compensate for that contained in such portions of slop as are not returned to the starch apparatus.

To recapitulate, my process in its present preferred form consists in comminuting fresh cassava as soon as possible after digging, treating to arrest the activity of enzyms, converting the comminuted cassava into starch milk, separating the starch therefrom and finally fermenting the residual liquid to produce alcohol. Though of course other disposition, such as the manufacture of glucose, etc., can be made of the sugar-containing liquid, it is preferred to ferment it and obtain alcohol as described.

A very suitable concentration for the liquid sent to the fermenters is about 17° or 18° Brix; that is, about 17 or 18 per cent. of sugars. This is about double the concentration of the normal cell juices of fresh cassava. However, weaker or stronger liquids can be worked.

What I claim is:—

1. The process of preparing valuable products from cassava which consists in disintegrating fresh cassava, treating to arrest enzymic activity, preparing a starch milk containing the soluble sugars of the cassava in the presence of enzym-retarding bodies, separating the starch fermenting the sugars remaining in the residual liquid after separation of starch to produce alcohol and recovering alcohol therefrom.

2. The process of preparing valuable products from cassava which consists in disintegrating fresh cassava, treating to arrest enzymic activity, preparing a starch milk containing the soluble sugars of the cassava by means of a portion of previously settled starch milk, separating the starch from such milk, returning a portion of the separated liquid to serve anew in making starch milk, fermenting the sugars contained in the residual liquid to produce alcohol and recovering alcohol therefrom.

3. The process of preparing valuable products from cassava which consists in disintegrating fresh cassava, rapidly drying to arrest enzymic activity, preparing a starch milk containing enzym-arresting substances from the desiccated cassava, separating the starch from the milk, finally fermenting the residual liquid to produce alcohol and recovering alcohol therefrom.

4. The process of preparing valuable products from cassava which consists in preparing a starch milk from such cassava in the presence of and containing enzym-arresting chemicals, separating the starch from the milk, finally fermenting the residual liquid to produce alcohol and recovering alcohol therefrom.

5. The process of preparing valuable products from cassava which consists in preparing a starch milk from cassava, enough of said cassava being used in a desiccated state to render said starch milk richer in sugars than the normal cell sap of such cassava in the fresh state, removing the starch from the milk, finally fermenting the residual liquid to produce alcohol and recovering alcohol therefrom.

6. The process of preparing valuable products from cassava which consists in preparing a starch milk from such cassava with a water extract of previously treated cassava admixed with some clarified slop from an alcohol still, removing the starch from the milk, finally fermenting the residual liquid and recovering alcohol therefrom.

7. The process of preparing valuable products from cassava which consists in disintegrating fresh cassava, treating with enzym-arresting chemicals, preparing a starch milk, separating the starch from the milk, fermenting the residual liquid to produce alcohol, distilling off the alcohol and finally returning the residual liquid to form new starch milk with more cassava.

8. The process of preparing valuable products from cassava which consists in disintegrating fresh cassava, preparing a starch milk containing the soluble sugars of the cassava, separating the starch, fermenting the sugars remaining in the residual liquid after separation of starch to produce alcohol and recovering alcohol therefrom.

9. The process of preparing valuable products from cassava which consists in preparing a starch milk from cassava, such starch milk containing the soluble sugars of such cassava, separating starch from such milk and further treating the milk from which such starch has been separated to produce alcohol.

In testimony whereof, I affix my signature in the presence of two witnesses.

CHARLES C. MOORE, Jr.

Witnesses:
 BLANCHE L. CHADWELL.
 K. P. McELROY.